United States Patent Office 2,719,812
Patented Oct. 4, 1955

2,719,812
STABILIZED AQUEOUS SOLUTIONS OF STREPTOMYCIN

Edward J. Hanus, Bayonne, N. J., assignor to Merck & Co., Inc., Rahway, N. J., a corporation of New Jersey No Drawing. Application August 7, 1953,
Serial No. 373,044

11 Claims. (Cl. 167—65)

This invention relates to stable aqueous solutions of streptomycin. More particularly the invention relates to new aqueous streptomycin preparations wherein high concentrations of streptomycin in combination with a plurality of stabilizing agents are resistant to discoloration, precipitation, and deterioration over long extended periods of time.

One of the problems in the distribution and administration of streptomycin has been its relative instability in aqueous solution even at room temperature as evidenced by discoloration and loss of activity in such solutions. Various attempts have been made in the past to incorporate stabilizing agents in aqueous streptomycin solutions with some success at low streptomycin concentrations. There is a distinct need, however, for solutions containing 400 to 600 mg. per ml., and perhaps higher concentrations, of streptomycin, and at such high concentrations stabilizing agents heretofore employed have not been satisfactory. As a result it has been necessary in supplying streptomycin for administration as high potency solutions, to distribute it in the form of a solid to which sterile water or saline solution is added to prepare the desired solution shortly prior to administration.

I have now discovered that high potency streptomycin solutions can be effectively stabilized against deterioration and discoloration by adding to the solution in relatively low concentrations a plurality of stabilizing agents which individually, even in substantially higher concentrations, do not have the ability to stabilize high potency solutions.

The improved products in accordance with my invention comprise high potency aqueous streptomycin solutions or solutions containing both streptomycin and dihydrostreptomycin buffered to about pH 6 and containing as stabilizing components in the amount of about 0.1 to 1.0%, at least one substance selected from the group consisting of monothioglycerol, monothiosorbitol and monothioglucose, and in the amount of about 0.1 to 2.5%, at least one substance selected from the group consisting of salts of sulfurous and hydrosulfurous acids and aldehyde addition products thereof. Typical substances of the latter group which are particularly effective are sodium bisulfite, sodium formaldehyde sulfoxylate, potassium metabisulfite, and sodium hydrosulfite. The aggregate amount of the two stabilizing components should preferably be about 0.5 to 1.5% of the streptomycin solution, and while the relative proportions of the two components can be varied, best results have been obtained when 1 to 2 parts of sodium bisulfite or related substances is used for each part of monothioglycerol or related substance.

The best results thus far have been obtained by using in combination about 0.2 to 0.7% of monothioglycerol and about 0.25 to 0.75% of sodium bisulfite as the stabilizing agents.

While various of the available salts of streptomycin which are extensively used as therapeutic agents, can be employed in preparing my improved, stable solutions, most favorable results have been obtained with streptomycin sulfate and with mixtures of streptomycin and dihydrostreptomycin sulfates. Such mixtures can suitably contain approximately equivalent amounts of streptomycin and dihydrostreptomycin. It is important to provide in the solution a pH of about 5.0 to 6.5, but preferably about 6.0 as streptomycin becomes progressively less stable at higher or lower pH conditions. Adjustment and control of pH can be accomplished by adding a buffer such as sodium citrate, and if necessary, a small amount of acid or base for pH adjustment. In my preferred solution employing streptomycin sulfate the addition of sodium citrate alone is generally sufficient to provide a pH of 6.

In addition to the stabilizing agents and pH regulating components other components may be included to provide pharmaceutically acceptable solutions of various types. Thus for example, a small amount i. e. 0.2 to 0.5%, of a preservative such as phenol is preferably added. It will further be noted that while my improved solutions are particularly adapted for parenteral administration, it is also within the scope of my invention to prepare stable products for oral administration. In oral preparations one or more of the customary flavoring agents can be included.

The procedure for preparing my stable solutions, particularly when intended for parenteral administration, involves first dissolving in the required amount of water the stabilizing agents, buffer, and preservative and sterilizing the resulting solution, as for example, by aseptic filtration. Sterile streptomycin salt is then dissolved under aseptic conditions in the sterilized vehicle, and the resulting solution is clarified if necessary and subdivided into suitable distribution containers under aseptic conditions.

The following examples will serve to indicate how a typical stable streptomycin solution in accordance with my invention can be prepared, but it is to be understood that these examples are given by way of illustration and not of limitation.

Example I

| | | |
|---|---|---|
| Streptomycin sulfate | grams | 690 |
| Sodium bisulfite | do | 5 |
| Sodium citrate —2H$_2$O | do | 20 |
| Monothioglycerol | do | 2.5 |
| Phenol | do | 2.5 |
| Distilled water, q. s | ml | 1000 |

The solution is prepared by dissolving the sodium bisulfite, monothioglycerol, sodium citrate and phenol in water and sterilizing the solution by aseptic filtration. Sterile streptomycin sulfate is then dissolved in the sterilized vehicle. The solution is clarified and then subdivided into suitable vials under aseptic conditions.

In the above example the sodium bisulfite may be replaced with equal amounts of sodium formaldehyde sulfoxylate, potassium metabisulfite, sodium hydrosulfite and the like; and the monothioglycerol may be replaced with monothiosorbitol or monothioglucose. Aqueous solutions of streptomycin prepared in this manner often possess a faint but characteristic yellow color which is due to certain impurities present in the sterptomycin employed. These solutions, after storage at room temperature for periods of 12 months and longer have shown no significant change in color or antibiotic potency.

Example II

A vehicle was prepared containing:

| | | |
|---|---|---|
| Sodium bisulfite | gm | 33.35 |
| Monothioglycerol | gm | 33.36 |
| Sodium citrate | gm | 133.36 |
| Phenol-reagent | gm | 16.68 |
| Pyrogen-free water, to make | ml | 4000.00 |

The solids were dissolved in water to the 4000 ml. volume. The resulting solution was sterilized by filtration and portions thereof were utilized to make up streptomycin solutions as follows:

(a) 950 gms. of sterile streptomycin sulfate was dissolved in a sufficient amount of this solution under sterile conditions to give a total volume of 1377 ml. The solution was allowed to stand below 15° C. for about 48 hours before filtering and subdivided into suitable vials. This solution contained the equivalent of 500 mg. of streptomycin base per ml.

(b) 875 gms. of sterile streptomycin sulfate was dissolved in 761 ml. of the sterile vehicle to give a total volume of 1268 ml. The solution was chilled below 15° C. for about 48 hours, filtered and subdivided. This solution contained the equivalent of 500 mg. of streptomycin base per ml.

(c) 690 gms. of sterile streptomycin sulfate was dissolved in 1600 ml. of the vehicle to give a total volume of 2000 ml. The resulting solution was chilled to about 15° C. for about 48 hours, filtered and subdivided into suitable vials. This solution contained the equivalent of 250 mg. of streptomycin base per ml.

After storage at room temperature for three months solutions a, b and c above described showed no appreciable change in appearance or in antibiotic activity. Under more severe test conditions, i. e. storage at 40° C. for five months in the case of solutions a and b and four months in the case of solution c, there was no appreciable change in antibiotic activity. The more concentrated solutions a and b darkened gradually to clear amber solutions, but with no precipitate formation and the more dilute solution c showed no appreciable change in the four months period.

In contrast to the foregoing, streptomycin solutions previously available have frequently shown decided discoloration after three months storage at room temperature and precipitate formation after as little as two months storage at 40° C.

*Example III*

A solution was prepared containing:

| | |
|---|---|
| Dihydrostreptomycin sulfate _____gm__ | 325 |
| Streptomycin sulfate _____gm__ | 345 |
| Monothioglycerol (50% aqueous solution)__gm__ | 5 |
| Sodium bisulfite _____gm__ | 5 |
| Sodium citrate—2H₂O _____gm__ | 20 |
| Phenol _____gm__ | 2.5 |
| Distilled water _____cc__ | 1000 |

The solution and a control (streptomycin and dihydrostreptomycin in distilled water) were prepared as described and then stored at 40° C. and 50° C. The solution was then examined at regular intervals for discoloration and changes in pH. The solution and the control were both originally clear and faint yellow in color. After storage at 40° C. for 28 days, the solution remained clear and yellow in color, whereas the control after 14 days had become dark brown with formation of a precipitate. When stored at 50° C. the solution remained clear and yellow in color after 25 days changing to an amber color after 30 days, whereas the control in 4 days became very dark brown and after 9 days became a charred black solid mass.

One of the limiting factors in preparing high potency streptomycin solutions for injection is the viscosity of solutions containing high concentrations of streptomycin sulfate. Solutions containing a mixture of streptomycin sulfate and dihydrostreptomycin sulfate are considerably less viscous than solutions of streptomycin sulfate alone having the same order of antibiotic activity. Thus particularly in the more potent stable solutions in accordance with my invention it is desirable that the antibiotic agents comprise a mixture of streptomycin and dihydrostreptomycin. In this connection it is to be understood that throughout the specification and claims, general reference to streptomycin solutions embraces both solutions containing a streptomycin salt and solutions containing a mixture of streptomycin and dihydrostreptomycin salts.

It will also be understood that my stable streptomycin solutions can contain other therapeutically active substances. By way of illustration salts of penicillin can be added to the stable solutions of streptomycin or streptomycin and dihydrostreptomycin where it is desired to have in a single solution a plurality of active substances.

Various changes and modifications in the formulations and procedures herein disclosed may occur to those skilled in the art, and to the extent that such changes and modifications are embraced by the appended claims, it is to be understood that they constitute part of my invention.

I claim:

1. A streptomycin solution stabilized against discoloration and deterioration comprising an aqueous solution containing in excess of about 400 mg. per ml. of solution of a streptomycin salt, said solution having a pH of about 5.0 to 6.5 and containing as stabilizing components in the amount of about 0.1 to 1.0%, at least one substance selected from the group consisting of monothioglycerol, monothiosorbitol, and monothioglucose, and in the amount of about 0.1 to 2.5%, at least one substance selected from the group consisting of salts of sulfurous and hydrosulfurous acids and aldehyde addition products thereof.

2. A streptomycin solution as defined in claim 1 wherein sodium citrate is included as a buffering agent for maintaining a pH of about 6.0.

3. A streptomycin solution as defined in claim 1 wherein the aggregate amount of the two stabilizing components is about 0.5 to 1.5% of said solution.

4. A streptomycin solution as defined in claim 1 wherein the stabilizing components are employed in the proportions of 1 part of one component to about 0.5 to 2.0 parts of the other component.

5. A streptomycin solution as defined in claim 1 wherein the stabilizing components are employed in the proportions of 1 part of one component to about 0.5 to 2.0 parts of the other component, and the aggregate amount of said stabilizing components is about 0.5 to 1.5% of said solution.

6. A streptomycin solution stabilized against discoloration and deterioration comprising an aqueous solution containing in excess of about 400 mg. per ml. of solution of a streptomycin salt, said solution having a pH of about 6.0 and containing as stabilizing components about 0.2 to 0.7% of monothioglycerol and about 0.25 to 0.75% of sodium bisulfite.

7. A streptomycin solution stabilized against discoloration and deterioration comprising an aqueous solution containing in excess of about 400 mg. per ml. of solution of a streptomycin salt, said solution having a pH of about 6.0 and containing as stabilizing components about 0.5% of monothioglycerol and about 0.25% of sodium bisulfite.

8. A streptomycin solution stabilized against discoloration and deterioration comprising an aqueous solution containing in excess of about 400 mg. per ml. of solution of a mixture of streptomycin and dihydrostreptomycin salts, said solution having a pH of about 6.0 and containing as stabilizing components in the amount of about 0.1 to 1.0%, at least one substance selected from the group consisting of monothioglycerol, monothiosorbitol, and monothioglucose, and in the amount of about 0.1 to 2.5%, at least one substance selected from the group consisting of salts of sulfurous and hydrosulfurous acids and aldehyde addition products thereof.

9. A streptomycin solution stabilized against discoloration and deterioration comprising an aqueous solution containing in excess of about 400 mg. per ml. of solution of streptomycin sulfate, said solution having a pH of about 6.0 and containing as stabilizing components in the amount of about 0.1 to 1.0%, at least one substance selected from the group consisting of monothioglycerol, monothiosorbitol, and monothioglucose, and in the amount of about 0.1 to 2.5%, at least one substance selected from the group consisting of salts of sulfurous and hydrosulfurous acids and aldehyde addition products thereof.

10. A streptomycin solution stabilized against discoloration and deterioration comprising an aqueous solution containing in excess of about 400 mg. per ml. of solution of a mixture of streptomycin and dihydrostreptomycin sulfate, said solution having a pH of about 6.0 and containing as stabilizing components in the amount of about 0.1 to 1.0%, at least one substance selected from the group consisting of monothioglycerol, monothiosorbitol, and monothioglucose, and in the amount of about 0.1 to 2.5%, at least one substance selected from the group consisting of salts of sulfurous and hydrosulfurous acids and aldehyde addition products thereof.

11. A streptomycin solution stabilized against discoloration and deterioration comprising an aqueous solution containing in excess of about 400 mg. per ml. of solution of a mixture of approximately equivalent amounts of streptomycin and dihydrostreptomycin sulfate, said solution having a pH of about 6.0 and containing as stabilizing components in the amount of about 0.1 to 1.0%, at least one substance selected from the group consisting of monothioglycerol, monothiosorbitol, and monothioglucose, and in the amount of about 0.1 to 2.5%, at least one substance selected from the group consisting of salts of sulfurous and hydrosulfurous acids and aldehyde addition products thereof.

References Cited in the file of this patent

UNITED STATES PATENTS

| | | |
|---|---|---|
| 2,473,339 | Kirchmeyer | June 14, 1949 |
| 2,643,998 | Bray | June 30, 1953 |
| 2,657,171 | Macek et al. | Oct. 27, 1953 |